United States Patent
Nóbrega

(10) Patent No.: US 8,201,830 B2
(45) Date of Patent: Jun. 19, 2012

(54) AIRTIGHT MAGNETIC SEAL FOR BEARING CASINGS

(75) Inventor: Paulo Roberto Leite Nóbrega, SaõVicente (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 246 days.

(21) Appl. No.: 12/461,791

(22) Filed: Aug. 25, 2009

(65) Prior Publication Data

US 2009/0315271 A1    Dec. 24, 2009

Related U.S. Application Data

(63) Continuation-in-part of application No. 11/585,332, filed on Oct. 24, 2006, now abandoned.

(30) Foreign Application Priority Data

Oct. 31, 2005    (BR) ..................... 0505173

(51) Int. Cl.
*F16J 9/00* (2006.01)
*F16J 15/34* (2006.01)
*F01D 15/00* (2006.01)

(52) U.S. Cl. ........ 277/345; 277/412; 277/417; 277/378; 277/348

(58) Field of Classification Search .................. 277/378, 277/345, 411, 412, 348, 417
See application file for complete search history.

(56) References Cited

U.S. PATENT DOCUMENTS

| | | | |
|---|---|---|---|
| 2,843,403 A | 7/1958 | Stevenson | |
| 2,883,212 A | 4/1959 | Laser | |
| 3,050,319 A | 8/1962 | Colby | |
| 3,128,104 A | 4/1964 | Fritz | |
| 3,708,177 A * | 1/1973 | Baermann | 277/378 |
| 4,039,196 A | 8/1977 | Inouye | |
| 4,304,408 A | 12/1981 | Greenawalt | |
| 4,406,466 A * | 9/1983 | Geary, Jr. | 277/400 |
| 4,538,820 A | 9/1985 | Duffee | |
| 4,572,517 A | 2/1986 | Rockwood et al. | |
| 4,795,168 A * | 1/1989 | Adams et al. | 277/378 |
| 4,989,883 A | 2/1991 | Orlowski | |
| 5,039,113 A | 8/1991 | Gardner | |
| 5,078,411 A | 1/1992 | Geco | |
| 5,087,172 A | 2/1992 | Ferri et al. | |
| 5,158,304 A | 10/1992 | Orlowski | |

(Continued)

FOREIGN PATENT DOCUMENTS

BR    PI 0605141-3    6/2008

(Continued)

OTHER PUBLICATIONS

Author unknown "Centrifugal Pumps for Petroleum, Petrochemical and Natural Gas Industries", American Petroleum Institute, API Standard 610, 9$^{th}$ Ed., Jan. 2003, 204 pages.

*Primary Examiner* — Vishal Patel

(74) *Attorney, Agent, or Firm* — Nixon & Vanderhye PC

(57) ABSTRACT

The airtight magnetic seal, in a compact single body, made of two concentric sections, an inner section (1a) and an outer section (1b), unitized, which are able to rotate independently. These sections are engaged and squared to create a permanent contact-seal inside in combination with two labyrinth-seals type and associated drains at each end, and a pressure relief safety means, when the seal is embedded into an annulus in a rotary operational assembly.

5 Claims, 4 Drawing Sheets

U.S. PATENT DOCUMENTS

| | | | |
|---|---|---|---|
| 5,161,804 A * | 11/1992 | Orlowski et al. | 277/378 |
| 5,344,161 A | 9/1994 | Sandgren | |
| 5,388,843 A | 2/1995 | Sedy | |
| 5,409,240 A | 4/1995 | Ballard | |
| 5,421,593 A * | 6/1995 | Aritsubo et al. | 277/361 |
| 5,498,006 A | 3/1996 | Orlowski | |
| 5,730,447 A * | 3/1998 | Dawson et al. | 277/378 |
| 5,775,169 A * | 7/1998 | Solomon et al. | 74/490.01 |
| 5,865,441 A * | 2/1999 | Orlowski | 277/364 |
| 5,873,574 A | 2/1999 | Ringer | |
| 6,116,609 A | 9/2000 | Azibert | |
| 6,186,510 B1 * | 2/2001 | Reagan | 277/371 |
| 6,471,215 B1 | 10/2002 | Drago et al. | |
| 6,517,078 B2 | 2/2003 | Schruefer et al. | |
| 6,722,657 B2 * | 4/2004 | Hood et al. | 277/345 |
| 6,761,359 B2 | 7/2004 | Azibert | |
| 6,805,358 B2 | 10/2004 | Dawson et al. | |
| 6,905,123 B2 | 6/2005 | Goldswain | |
| 7,144,015 B2 | 12/2006 | Roberts-Haritonov et al. | |
| 7,427,070 B2 | 9/2008 | Chitren et al. | |
| 7,521,827 B2 * | 4/2009 | Orlowski et al. | 310/68 R |
| 7,722,050 B2 * | 5/2010 | Roddis | 277/378 |
| 7,748,715 B2 * | 7/2010 | Roddis | 277/347 |
| 7,905,496 B2 * | 3/2011 | Roddis | 277/425 |
| 2006/0006602 A1 | 1/2006 | Roddis | |
| 2007/0194536 A1 | 8/2007 | Nóbrega | |
| 2008/0042364 A1 * | 2/2008 | Zheng et al. | 277/378 |
| 2008/0050261 A1 * | 2/2008 | Roddis | 418/104 |
| 2010/0219585 A1 * | 9/2010 | Roddis et al. | 277/347 |
| 2011/0101618 A1 * | 5/2011 | Orlowski et al. | 277/412 |
| 2011/0109047 A1 * | 5/2011 | Tones et al. | 277/412 |

FOREIGN PATENT DOCUMENTS

| | | | |
|---|---|---|---|
| EP | 105616 A2 * | 4/1984 | |

* cited by examiner

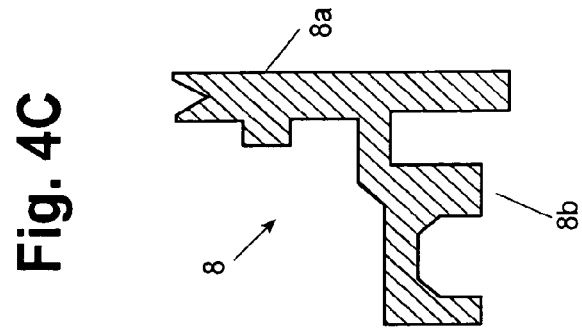
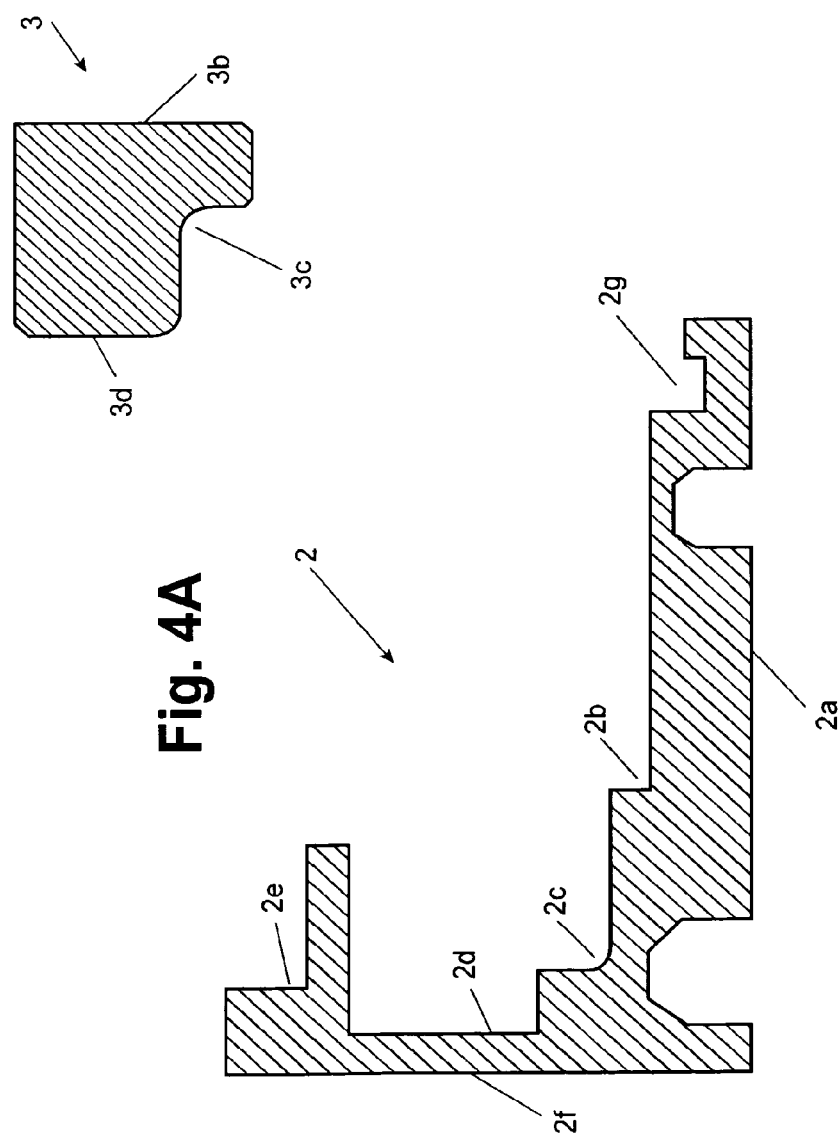

AIRTIGHT MAGNETIC SEAL FOR BEARING CASINGS

CROSS REFERENCE TO RELATED APPLICATION

This is a continuation-in-part application of co-pending U.S. patent application Ser. No. 11/585,332 filed on 24 Oct. 2006, which claims the benefit of priority and incorporates by reference the contents of Brazilian Patent Application No. PI0505173-8 filed on Oct. 31, 2005.

BACKGROUND OF THE INVENTION

1. Field of the Invention

The present invention relates to an improved airtight seal, with magnetic bodies acting on two elements, to create a contact-seal inside, in combination with two labyrinth-seal type on each end. The configuration results in a compact single body of easy installation in centrifugal pumps, within the annulus between the bearing casing and the rotatable shaft.

2. Description of the Related Art

The oil industry and other diverse processes with great frequency involve, and make use of, various types of centrifugal pumps.

Petroleum, from its extraction on production platforms, to its transportation through various methods, such as oil pipes or tanker ships, and mainly in the refining process itself, in specific industrial parks, needs to be pumped through thousands of meters of pipes, hundreds of systems, which, in the popular jargon, are known as the oil extraction and refining process.

Thus, the most important components and those most subjected to wear in the oil industry, are the pumps, which are used in diverse applications, which come in various models and powers, which require great attention in their specifications and maintenance.

Due to the fact that they are an indispensable component in any stage of the oil industry, many pumps are used without interruption, stopping only in the event of failures or for scheduled maintenance.

However pumps have ball bearings, inside the bearing casings, that are sensitive to any contaminant from the environment where the pump is running. They also possess a component particularly subject to failure, the seal, which isolates the ball bearings on the inside of bearing casings as well as preventing any trace of lubricant inside the bearing casing from contaminating the environment.

In this sense, there are some models of seals, which for the purpose of being in accordance with standards, try to satisfy to the maximum these conditions of isolation. One of these is the American Petroleum Institute Standard—API 610,9th ed. (2003), which states:

"5.10.2. 7—Bearing cases must be designed to prevent contamination from moisture, dirt and other foreign objects . . . This must be accomplished not by injecting compressed air, but through the use of seals, such as labyrinth or magnetic seals, in the areas where the shaft crosses through the casing"

However, complete fulfillment of this requirement can only be accomplished by using a contact seal, therefore using labyrinth seals, even though they are accepted by the standard, allows steam to enter and condense inside the oil. This option, in practice, generates great losses to the oil industry, especially when all the hours involved in down time is accounted for in the production process, as well as the cost of man-hours in maintenance and repair of the ball bearings in the pumps.

It has been possible to measure these damages due to studies that have demonstrated that the presence of only 0.02% of water in the oil of casings is sufficient to reduce the useful life of the ball bearings up to 48%.

Thus, the greatest concern of the technician responsible for maintenance of the pumps is to make the best choice from the existing models of seals, in order to prevent failures, especially when dealing with 20 centrifugal pumps. Any unscheduled downtime, especially those caused by failures of the mechanical seal in the bearing casings, not only interrupts the process with which that pump is associated, but, invariably, damages many other pump components as well.

Therefore, the better the quality of the isolation provided by the casing seal, the greater the durability of the equipment. It is in this way that the oil industry's technical designers attempt to surpass the requirements of Standard API 610,9th ed. (2003), and they conduct their projects so that the seal of the bearing casings (mainly in centrifugal pumps), will be completely air tight.

Currently, there are some models known that attempt to fulfill this condition, for example:

1) Mechanical Airtight Seal That Uses Springs.

The GBS® model developed by the A. W. Chesterton Company is a good example. This type of airtight seal has a good service life expectancy and performance when mounted correctly, however the assembly requires special attention be given to its alignment. It is a seal that occupies little external space, and offers a descending wear curve. However when the required criteria are not observed when aligning the seal, many failures will occur. The seal assembly is difficult due to the high degree of interference presented for the O-ring in the rotary head. The repair of the seal is difficult and offers little protection against direct jets of liquid on the outside surface of the operation.

2) Magnetic Airtight Seal, With Magnets in the Attractive Position.

The Magnum-S® model may be mentioned as an example developed by the Isomag Corporation. This type of airtight seal is easy to assemble and occupies little external space. However it offers an upward wear curve, because the greater the wear of the material, the greater the distance between magnets and greater the force of attraction, causing greater wear and a shorter service life expectancy. It is also a seal that cannot be repaired and offers little protection against direct jets of liquid on the outside surface of the operation.

3) Magnetic Airtight Seal, With Magnets in the Repulsive Position.

The RMS 700® model may be mentioned as an example developed by the Improseal Corporation. This type of airtight seal needs a great amount of free external area, does not offer any type of external protection, which is totally exposed to the inclemency of the environment. This also is a seal that cannot be repaired. Its characteristic of being exposed to dirt and because it requires a large external mounting area, makes it practically impossible to adapt it to pumps (mainly centrifugal pumps).

In the case of the bearing casing seal models that currently use magnets in the repulsive position specifically; their construction is that of a stationery head.

The head is one of the key elements for maintaining the impermeability of the project, with its function being to support the primary seal, which is pressed against its surface in such a way as to maintain permanent and hermetic contact.

This contact between the head and the primary seal must be preserved from contamination emanating from the environment, such as dust, solid debris, or direct jets of liquids, as it prevents in this way premature eroding between the head and the primary seal, which is already in a permanent state of friction.

The head is fixed upon the sleeve by means of an O-ring and this set of components travels along with the rotation of the shaft.

The primary seal is fixed to the housing by means of an O-ring, behind which are also mounted two collars of magnets in the repulsive position. The magnets in direct contact with the housing and the back of the primary seal travel along with the rotation of the shaft, and promote the compression of the primary seal towards the rotary head.

There is a great advantage to this type of seal created through pressure caused by the repulsive force of magnets: with the passage of time, wear due to friction between the head and the primary seal will cause aberrance between the magnets pressuring the seal against the head. This aberrance will result in a reduction in the repulsive force, and consequently in the friction pressure between the head and the primary seal. This results in less abrasion between these two components and, for this reason, a much greater service life expectancy and preservation of the properties of impermeability. However the seals on bearing casings that use this sealing system, present problems with alignment that can invalidate this advantage.

Seals, such as those mentioned in the $1^{st}$ example, that use rotary heads may offer several advantages which may be invalidated if not mounted with perfect alignment, therefore, in the event that the alignment is not accomplished, abrasion may be even greater than the other models of seals for bearing casings that use springs or magnets in the attractive position.

Alignment is a requirement that is very difficult to achieve in the bearing casings of models currently in existence, because the head is stationery, and the primary seal is mounted upon a rotary sleeve. In turn, the sleeves are provided with only one O-ring.

This type of construction that places the sleeve on the only O-ring causes a misalignment in the setting of the head on the primary seal, and requires that the repulsive action of the magnets continuously correct, on every turn, the deficiencies of this misalignment.

In models that are currently available on the market, perfect alignment is only obtained by very meticulous installation work and preferably calibrated with a time source dial indicator for centering. It is a task that in addition to requiring its own specialized tools, demands time and must be performed by a skilled technician.

The material currently used on the contact surface of the head presents yet another problem. Generally, stainless steel is used, which is somewhat deficient in its capacity to resist abrasion, and also generates high temperatures.

Therefore, no seal model for bearing casings currently available offers a repair feature for the seal assembly. Due to fact that their most sensitive components are generally susceptible to excessive exposure to inclemency, at the end of their service lives, they are so deteriorated that repair is not feasible.

The three models of airtight seals for bearing casings, in spite of offering advantages, also present disadvantages that may result in premature failures or the need for periodic maintenance.

Considering the fact that each pump needs at least two seals, and that a refinery of average size is using around 1000 pumps, easily proves the problem and the damage caused by the disadvantages present in the current sealing technique used in bearing casings.

SUMMARY OF THE INVENTION

This invention endeavors to provide an improved airtight mechanical seal that may be directly embedded within an annulus between a bearing casing (12) and a rotatable shaft (13) in rotating equipments such as a centrifugal pump.

The airtight magnetic seal (1) consists of one single body of two concentric sections, unitized: an inner section (1a) and an outer section (1b). In an operational assembly, the seal (1) can be embedded into an annulus and both sections are squared in one single body, for keeping a face contact-seal inside and labyrinth-seals at the interfaces with the enclosures at each end. Hence, any undesired liquid material within the seal (1) returns via two drains to the internal enclosure (I) and to the external enclosure (II), respectively; one drain being associated with a first labyrinth (16b) and another with a second labyrinth (16a).

Therefore, the seal (1) does operate free of waste that could cause elements wearing and life time reduction of the seal (1). The two sections interact to keep contamination out of the bearing casing, in the external enclosure, while keep the lubricant in the internal enclosure.

The outer section (1b) basically comprises stationary elements: a housing (4), a primary seal (5) with magnetic bodies (10a) and a collar (9) with magnetic bodies (10b). All these elements remain aligned within the housing (4) up to a metallic elastic ring (6) by action of an anti-rotational element (7), such as a pin, as shown in FIG. 2.

Aligned to the elements of the outer section (1b) there are engaged the inner section (1a) which basically comprises rotary elements: a central head (3), a sleeve (2) and a baffle (8). These elements may rotate while remain squared within the sleeve (2) which is locked to the baffle (8) by a locking ring (14); the baffle (8) is coupled onto the housing (4) and the whole inner section (1a) can rotate freely, as presented in the operational assembly in FIG. 1.

The airtight magnetic seal uses the repulsive property inherent in magnetic bodies (10a) and (10b) of the same polarity to keep seal components in permanent contact.

BRIEF DESCRIPTION OF THE DRAWINGS

The invention shall be described in more detail, together with the figures presented in the attached drawings that illustrate the airtight magnetic seal (1).

FIGS. 4A, 4B, and 4C are cross-sectional views, respectively, of each element of the inner section (1a), and key features.

DETAILED DESCRIPTION OF THE INVENTION

Figure 1:
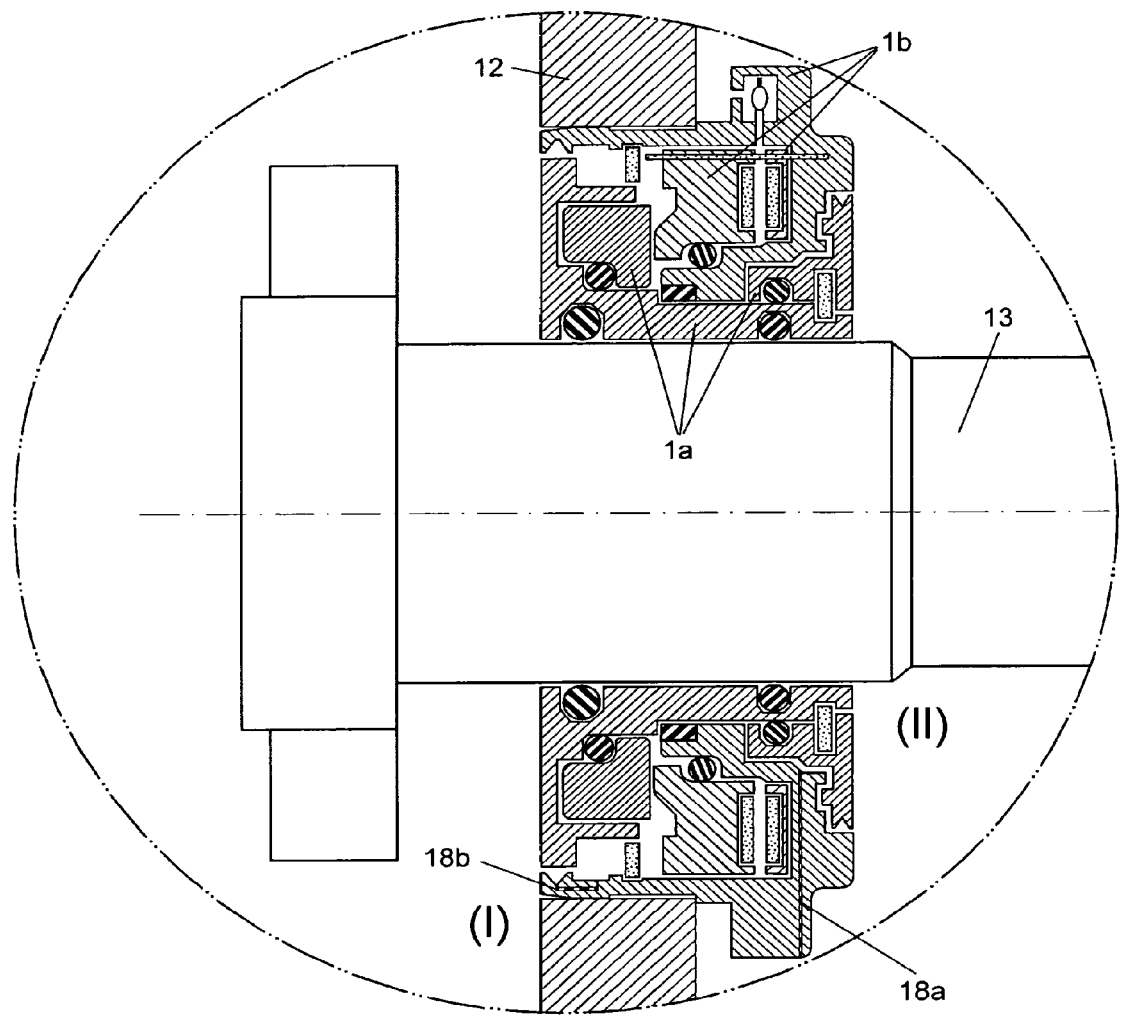
FIG. 1 shows a longitudinal cross-section view of an operational assembly with the airtight magnetic seal, consisting of one single body of two concentric sections unitized, an inner section (1a) and an outer section (1b), embedded within an annulus, between a bearing casing (12) and a rotatable shaft (13), and also illustrates the interface with the external enclosure (II) and with the internal enclosure (I) of the whole assembly.

Present invention refers to an improved airtight magnetic seal, configured in a compact single body that meets its main objective of hermetic sealing an annular space when it is embedded between a bearing casing (12) and a rotatable shaft (13), in an operational assembly as shown in FIG. 1.

The airtight magnetic seal, namely annular seal (1), comprises two concentric sections, unitized, an inner section (1a) and an outer section (1b), that are able to rotate independently, and that are engaged and squared to create a permanent contact-seal inside, in combination with two labyrinth-seals type and associated drains at each end, and a pressure relief from internal enclosure, when the seal is embedded in an operational assembly.

Once configured in a compact single body, the seal (1) can be directly embedded into an annulus, constituting an operational assembly, so that when in operation, the seal (1) meets its main objective. The two sections interact to keep contamination in the external enclosure (II), out of the bearing casing, while keep the lubricant in the internal enclosure (I), as illustrated in FIG. 1.

As shown in FIG. 1, when the seal (1) is embedded into an annulus, the outer section (1b) is kept stationary, while the inner section (1a) can rotate, following the movement of a rotatable shaft in the interior of the seal (1). Hence, the elements of the outer section (1b) are defined as being stationary elements, namely stator, while elements of the inner section (1a) are defined as being rotary elements, namely rotor.

In the operational assembly, the seal (1) is embedded and both sections are squared in a single body, so that they do not separate from one another while in use, keeping a face contact-seal inside and labyrinth-seals at the interfaces with the enclosures at each end. Hence, any undesired waste within the seal (1) returns via two drains (18b and 18a) to the internal enclosure (I) and to the external enclosure (II), respectively; one drain (18b) being associated with a first labyrinth (16b) and another drain (18a) with a second labyrinth (16a). Therefore, the seal (1) works free of waste that could cause element wear and life time reduction, while guaranteeing an optimum pressure inside.

The plurality of ring-type elements that configures the airtight magnetic seal (1) are presented as parts of each section, the outer section (1b) and the inner section (1a), as references in the figures.

Figure 2:
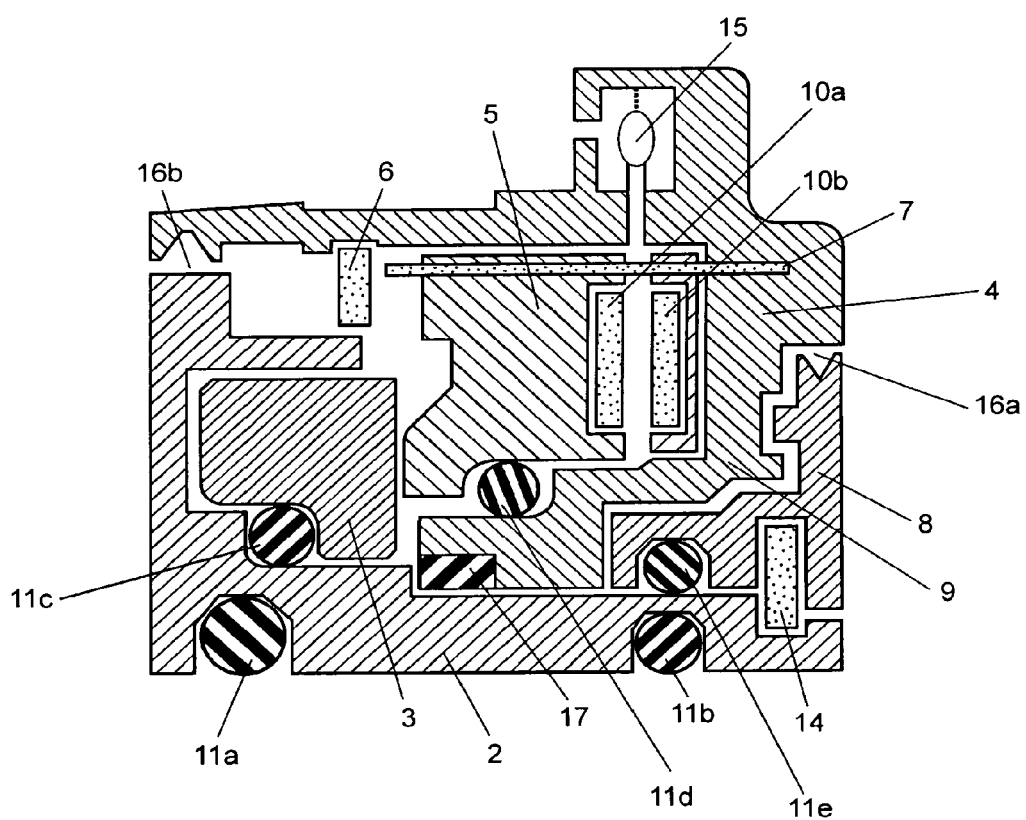
FIG. 2 shows a cross-section view of each element in the airtight magnetic seal (1) single body.
Figure 3B:
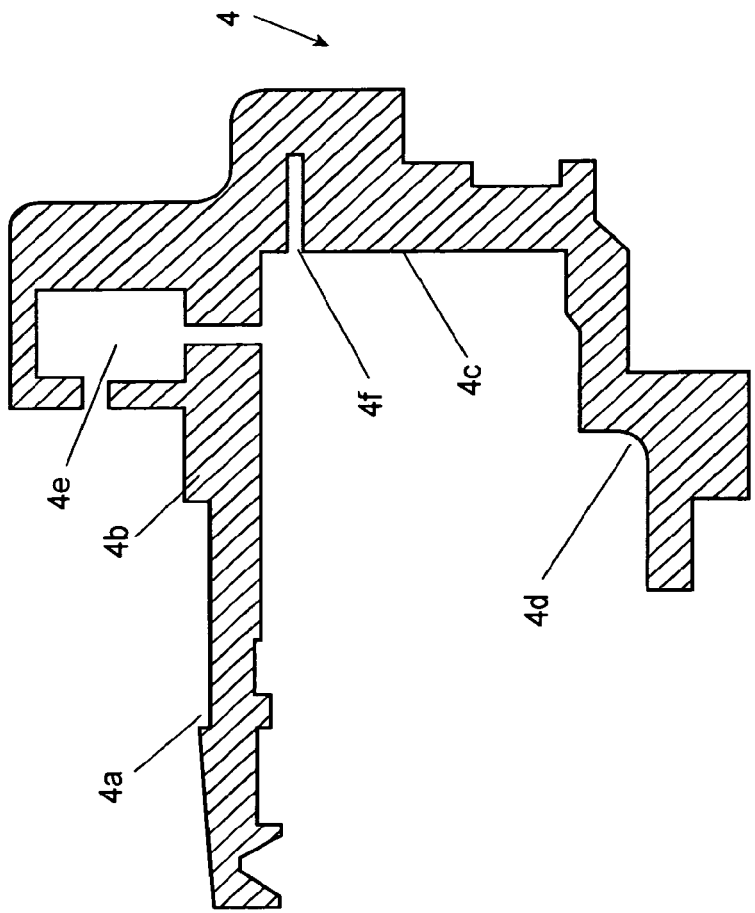
FIGS. 3A-3B are cross-sectional views of each element of the outer section (1b) of the airtight magnetic seal (1), and the key features.
Figure 3A:
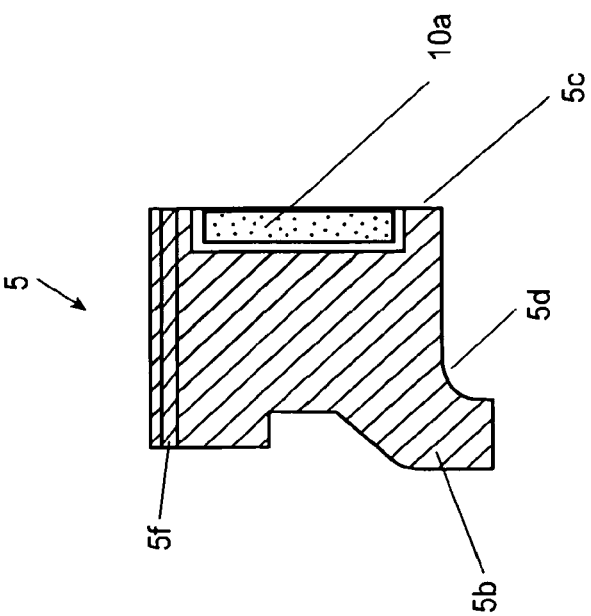

The outer section (1b) basically comprises stationary elements: a housing (4), a primary seal (5) with magnetic bodies (10a) and a collar (9) with magnetic bodies (10b). All these stationary elements remain aligned within the housing (4) up to a metallic elastic ring (6) by action of an anti-rotational element (7), such as a pin, as shown in FIG. 2.

The housing (4) whose cross-section is predominantly "J" shaped, has a cavity top perpendicular to two parallel sides, and its main features comprises:
A. a long side, axially oriented, which defines the utmost outer face of the seal (1); having on the outer face, a first slot (4a) for grabbing into an annulus and a second slot (4b) for handling from the outside; having on the inner face, a recess with the metallic elastic ring (6) and a bulge with a "V" cut at the end that creates a labyrinth (16b) associated with a drain groove to the internal enclosure; having one blind hole (4f) on the top face (4c) that fits an anti-rotational element (7); and having a hollow (4e) that lodges a relief valve (15) with an outlet to the external enclosure;
B. a short side, axially oriented; having on the outer face, a blocking resting ring (17) at the end; having on the inner face, a nick (4d) that lodges an internal blocking ring (11d); and
C. a cavity; having an internal top face (4c), flat circular; and having an outer face with multiple cuts for coupling.

The collar (9) with magnetic bodies (10b), flat shaped, is set on the internal top face (4c), directly fitted into the housing (4), which also fits the primary seal (5), in juxtaposition to the collar (9).

The primary seal (5) whose cross-section is predominantly a "foot" shaped, aligned toward the short side of the housing (4), has a nick (5d) that lodges the blocking ring (11d) on the nick (4d) and has a top face (5c) with magnetic bodies (10a) aligned toward the collar (9) and opposite to face (5b), which provides a face contact-seal between the two sections (1a) and (1b) as a result of the repulsive action between the magnetic bodies (10b) and the magnetic bodies (10a).

The number of these magnetic bodies is proportional to the balance of maximum and minimum load required for the primary seal (5) to act on a rotary central head (3) element. This is crucial to maintain a minimal and constant load in the face contact-seal between the outer section (1b) and the inner section (1a), i.e, between the primary seal face (5b) and the central head face (3b). This load defines the friction between the two faces, and consequently, the amount of heat generated and the wear caused that determine the lifetime of these components of the seal (1).

The magnetic bodies are, preferably made of samarium cobalt alloy, grade Sm2Co17 or neodymium-plated, grade 42H. However, regardless of format or the amount of magnetic bodies, the load to be applied must be within the range of 0.3 to 3.7 Kgf that references a seal for a rotatable shaft diameter up to 70 mm. This load can be increased to accomplish with greater shaft diameters.

Any formats of magnetic bodies are accepted, preferably, they are circular and inserted into holes in the collar (9) and in the face (5c) of the primary seal (5). But it is also possible for the repulsive force to be provided by a collar (9) fitted with elastic devices, such as springs.

By combining the load parameters applied and the wearing of the elements, the central head (3) and the primary seal (5), the distance between the collar (9) and the primary seal (5) can increase up to a value in which it is minimized the friction between the contact face (3b) and the contact face (5b). Therefore, these elements reach a balanced and uniform friction, seal and load that maintain the airtight magnetic seal operation at a non-wearing level during the lifetime of the operational assembly, for example, when the seal (1) is embedded in the bearing casing of a centrifugal pump.

As presented, all the elements of the outer section (1b) are kept squared within the housing (4), that must be aligned and fixed by an anti-rotational element (7), but a gap between the magnetic bodies (10a) and (10b) is required for proper repulsive action.

In a most preferred mode, the housing (4) is provided with a blind hole (4f) that fits the anti-rotational element (7) such as a pin, as shown in FIG. 2. In this case, the pin passes throughout an access hole (5f) in the primary seal (5) and a cut in collar (9), setting one end into the blind hole (4f) and the other end facing the metallic elastic ring (6). Although the use of a pin is recommended, other means of anti-rotational element (7) can be used to guarantee that no rotation of the stationary elements in the outer section (1b) could occur while in use.

Aligned to the elements of the outer section (1b) there are engaged the inner section (1a) which basically comprises rotary elements: a central head (3), a sleeve (2) and a baffle (8). These elements may rotate while remain squared within the sleeve (2) which is locked to the baffle (8) by a locking ring (14); the baffle (8) is coupled onto the housing (4) and the whole inner section (1a) can rotate freely, as shown in the operational assembly presented in FIG. 1.

The central head (3) has one face (3b) in permanent contact sealing with the face (5b) of the outer section (1b), and has an opposite face (3d) with an internal nick (3c) to lodge a blocking ring (11c) which helps squaring the central head (3) inside the seal (1). The contact between the two sections, namely inside contact-seal, is established by magnetic repulsive action among the magnetic bodies (10a) and (10b) in the outer section (1b).

The sleeve (2) has a cross-section predominantly "L" shaped, toward the housing (4), comprising a base and a wall: the base that defines an interface with the internal enclosure (I) and the wall that defines the utmost inner face of the seal (1), with the following features:

i) The base (2f) creates a labyrinth (16b), maintaining a minimum and sufficient gap to the outer section (1b) to prevent the entry of fluid inside the seal (1); and has an inner face with multiple cuts in a sequence for coupling to other elements, in which a first slot (2e) creates a barrier and a channel in connection with the end of the housing (4) and the metallic elastic ring (6), a second slot (2d) hosts the central head (3) on its face (3d), and a nick (2c) lodges the blocking ring (11c) in the nick (3c); and ii) The wall (2a) has an external face with two grooves at each end that fit two blocking rings (11a) and (11b), respectively, which make direct contact with a rotatable shaft; and has an internal face aligned to the short side of the housing (4) until the resting ring (17) tap the end of recess (2b), and a top groove (2g) that fits a locking ring (14) that locks the sleeve (2) to the baffle (8).

The baffle (8) has a cross-section predominantly "L" shaped of two sides: the external side (8a) that defines the interface between the seal (1) and the external enclosure, and the internal side (8b) that couples to the short side and the top of the housing (4), with the following features:

i) The external side (8a) has multiple cuts for coupling to the multiple cuts on the housing (4), ending in a "V" shaped cut that creates a labyrinth (16a) associated with a drain groove to the external enclosure; and ii) The internal side (8b) couples the short side of the housing (4), and has one groove on the external face where a blocking ring (11e) is lodged at the end, and has a cave that fits the locking ring (14) which hold the baffle (8) aligned to the sleeve (2).

The labyrinth of baffle (8) that meets the housing (4) and a centrifugal force, when in operation in an annulus, add a powerful barrier of protection against any contaminants that could reach the inside contact-seal between the face (5b) and face (3b).

Once configured, the seal (1) combines both effects of contact-seal inside and two labyrinth-seals (16b and 16a) associated with two drains (18b and 18a), at the interfaces with each enclosure while guarantee an optimum pressure inside.

In order to maintain the low friction between the face (3b) and face (5b), the elements should be made with special materials and, also, a dry lubricant can be used. Nevertheless, the central head (3) can be made of silicon carbide, or tungsten carbide, or ceramic, or stainless steel thermally and/or chemically treated, and also can be entirely made of or have only the face (3b) coated with silicon carbide. Also, the primary seal (5) can be made of carbon graphite impregnated with antimony or, optionally, with resin.

Under operational conditions, the seal (1) presents a perfect alignment of all elements and creates the face contact-seal between the two unitized sections: internal section (1a) and external section (1b). Thus, the two sections interact to ensured the hermetic operation of the seal (1), minimizing the wearing of the elements while guarantee an optimum pressure inside. As a consequence, due to the non-wearing of the central head (3) and the primary seal (5), after a simple substitution of the blocking rings, usually made of elastomeric material, and polishing the face (3b) of the central head (3), the seal (1) can return to use.

In order to ensure the alignment, the blocking ring (11c) is lodged between the central head (3) and sleeve (2) to promote the perfect contact between the face (3b) of the head (3) and face (5b) of the primary seal (5).

In addition to the blocking ring (11c), the central head (3) remains aligned to the sleeve (2) by the barrier of the sleeve (2) which prevents the radial movement of the central head (3).

Similarly, to ensure the alignment of the seal (1) and the permanent union of the two sections (1a) and (1b), the locking ring (14) prevents the radial movement of the baffle (8) locked to the sleeve (2) and the blocking-ring (11e) acts between the baffle (8) and the sleeve (2).

Also for better alignment and sealing, the blocking-ring (11d) works with a compression in the range of 0.2 to 0.5 mm, lodged between the nick (4d) of the internal housing (4) and the nick (5d) of the primary seal (5).

Therefore, the outer section (1b) interacts with the inner section (1a) by means of a locking ring (14) and blocking rings (11c), (11d) and (11e), so that both sections work as a single body to promote the tightness of the seal (1) into an annulus under operational conditions.

As illustrated in FIG. 1, in an operational assembly, the compact seal (1) body can operate between a stationary bearing casing (12) and a rotatable shaft (13). In this case, the housing (4) is embedded directly into the casing until the slot (4b) leans to the external face of the bearing casing (12), which makes it possible to handle with a simple tool from the external enclosure. The correct axial position of the housing (4) in the bearing casing (12) is determined by the slot (4b).

The correct axial position of the sleeve (2) on a rotatable shaft (13) and the correct effort to the contact-seal is self-established, without the need for special tools or technical expertise. To do so, the resting ring (17) of the outer section (1b) simply taps the slot (2b) of the sleeve (2), and is push up the position that ensures the auto squared of the seal installed in an annulus, between a bearing casing (12) and a rotatable shaft (13).

The correct installation of the seal (1) in an annulus is obtained by the rotation of the shaft (13) to guarantee the best positioning of the sleeve (2) on the shaft (13). Once installed, the interface between the seal (1) and the external enclosure (II) is given by the baffle (8) which is aligned to the sleeve (2), by the blocking ring (11e) and the locking ring (14) and engaged to the housing (4) by means of multiple cuts that couples the multiple cuts in the outer face of the housing (4).

Therefore, besides preventing the entry of contaminants from the external enclosure (II) by the labyrinth-seal (16a), the baffle (8) keeps the seal sections unitized as a single body, for enabling direct installation and removal in an annulus.

Just aligned and auto-squared, the face (5b) must exercise the right load contact on the face (3b), setting the face contact-seal between the elements that accompany the rotatable shaft (13) and those that remain stationary in relation to the bearing casing (12).

Therefore, the magnetic seal (1) dimensions should be proportional to an annulus, between a bearing casing (12) and a rotatable shaft (13) whose diameter is within the usual range from 20 to 100 mm. Also, the thickness of the seal (1) varies in accordance with the diameter of the rotatable shaft (13): from 20 to 79 mm, the thickness varies from 15 to 18 mm;

from 80 to 100 mm, the thickness is up to 20 mm and it is also possible to setup greater thickness. A great advantage of the configuration of the seal (1) is that allows smaller thickness when compared to repulsive magnetic seals currently available, and, eventually, makes it easy and safety the use of the seal (1) in centrifugal pumps and other rotating equipments that have limited annulus space for installation.

The seal (1) and its main features were described with reference to a preferred mode that should not limit the invention of the airtight magnetic seal for bearing casing.

The invention claimed is:

1. Airtight magnetic seal having a plurality of ring-type elements for direct installation between a stationary casing and a rotatable shaft, for sealing between an internal enclosure and an external enclosure, the seal comprising an inner section and an outer section concentric thereto, said inner and outer sections being engaged and squared with each other to create a permanent contact-seal inside the seal, in combination with labyrinth-seals, one at each axial planar end of the seal, and radial drains from inside the seal to the internal enclosure and to the external enclosure, wherein the seal keeps contamination in the external enclosure while keeping a lubricant oil in the internal enclosure, wherein:
    A. the outer section includes three stationary ring elements: a housing which grabs the stationary casing, a primary seal with a first sequence of magnetic bodies, and a collar with a second sequence of magnetic bodies, which mirrors the first sequence of magnetic bodies; the three stationary elements being aligned within the housing up to a metallic elastic ring by action of an anti-rotational element, and wherein:
    B. the inner section includes three rotary ring elements: a central head inside the seal, a sleeve with blocking rings which abuts the shaft, and a baffle which abuts the outer section; the three rotary elements rotating together while remaining engaged and squared to the outer section by a locking ring and blocking rings;
    wherein:
    a) the housing has a predominantly "J" shaped cross-section forming a cavity top perpendicular to two sides which are axially oriented to the rotatable shaft; the housing having a blind hole which fits the anti-rotational element inward the cavity top; the housing having one lateral hollow opened to the external enclosure which lodges a pressure relief valve; the housing having a drain to the external enclosure and a drain to the internal enclosure; and the housing has the following features:
        i) a long side defining an utmost outer face of the seal which grabs the stationary casing; an outer face of the long side being provided with a first slot for grabbing the stationary casing forwarded by a second slot for handling the seal from the external enclosure; and an inner face of the long side being provided with a recess fitted with the metallic elastic ring followed by a bulge with a "V" cut at a free end directed towards the interior of the seal which creates an inner one of said labyrinth-seals, which is associated with the drain to the internal enclosure when the outer section is engaged to the inner section;
        ii) a short side, an outer face of the short side being provided with a resting ring at an end which faces the inner section; and the short side having on an inner face toward the primary seal, a nick which lodges an "o" shaped blocking ring in between the primary seal; and
        iii) the cavity top having an internal flat circular top face which fits the collar with the second sequence of magnetic bodies; and having an external face with multiple cuts which abuts the outer section;
    b) the collar with the second sequence of magnetic bodies being flat shaped and being fitted on the internal top face of the cavity top;
    c) the primary seal having a cross-section predominantly "foot" shaped, being aligned toward the short side of the housing; the primary seal having a nick that lodges the "o" shaped blocking ring in between the nick; and the primary seal having a top face with the first sequence of magnetic bodies and having an opposite face which provides the contact-seal inside the seal between the inner and outer sections as a result of the repulsive action between the magnetic bodies; and
    d) the anti-rotational element holding tight the three stationary elements of the outer section and keeping a small gap between the magnetic bodies for repulsive action when the outer section is engaged to the inner section;
    e) the central head having one face in contact with said opposite face of the primary seal, and having a perpendicular face with an internal nick that lodges a blocking ring between the central head and the sleeve;
    f) the sleeve having a predominantly "L" shaped cross-section toward the housing that forms a base and a wall, the base defining the planar end of the seal toward the internal enclosure and the wall defining defines the utmost inner face of the seal, and the sleeve having the following features:
        i) the base creates said inner one of said labyrinth-seals labyrinth together with the outer section to keep lubricant oil in the internal enclosure; and has an inner face with multiple cuts in a sequence for coupling to the other rotary elements, where: a first slot creates a barrier and a channel in connection with the end of the housing and the metallic elastic ring, a second slot hosts the central head on its face, and a nick lodges the locking ring in the nick; and
        ii) the wall has an external face with two cavities at each end that fit two blocking rings, which abut the rotatable shaft; and has an internal face aligned to the short side of the housing until the resting ring the end of recess, having a channel that fits the locking ring that locks the sleeve to the baffle;
    g) the baffle having a predominantly "L" shaped cross-section including an external side that defines the interface between the seal and the external enclosure, and an internal side that couples the short side and the top of the housing, the baffle having the following features:
        i) the external side has multiple cuts for coupling to the multiple cuts on the housing, ending in a "V" shaped cut that creates a labyrinth-seal associated with the drain to the external enclosure; and
        ii) the internal side couples the short side of the housing, and has two cavities on the external face where a blocking ring is lodged at the end, and where the locking ring is lodged and locks the baffle to the sleeve.

2. Airtight magnetic seal according to claim 1, wherein the magnetic bodies are made of samarium cobalt alloy, grade Sm2Co17 or neodymium-plated, grade 42H.

3. Airtight magnetic seal according to claim 1, wherein the magnetic bodies are under a load range of 0.3 to 3.7 Kgf.

4. Airtight magnetic seal according to claim 1, wherein the magnetic bodies are flat circular shaped.

5. Airtight magnetic seal according to claim 1, wherein the anti-rotational element is a pin that passes throughout an access hole in the primary seal and a cut in the collar, setting one end inward the blind hole and the other end facing the metallic elastic ring.

* * * * *